United States Patent [19]

Harvey et al.

[11] Patent Number: 5,769,925

[45] Date of Patent: Jun. 23, 1998

[54] PROCESS FOR THE ELUTION OF PRECIOUS METALS ABSORBED ON ACTIVE CARBON

[75] Inventors: Sarah Harvey, Louvain-La-Neuve; André Van Lierde, Brussels; Pierre Louis, Wavre, all of Belgium

[73] Assignee: UM Enginerring S.A., Olen, Belgium

[21] Appl. No.: 605,016

[22] PCT Filed: Sep. 15, 1994

[86] PCT No.: PCT/EP94/03091

§ 371 Date: Jun. 12, 1996

§ 102(e) Date: Jun. 12, 1996

[87] PCT Pub. No.: WO95/08651

PCT Pub. Date: Mar. 30, 1995

[30] Foreign Application Priority Data

Sep. 21, 1993 [BE] Belgium .................................. 9300987

[51] Int. Cl.[6] .................................................. C22B 11/00
[52] U.S. Cl. .................................. 75/710; 75/421; 75/422; 75/423; 75/426; 75/427; 75/428; 75/721; 75/729; 75/732; 75/735; 75/737; 75/744; 210/684; 210/685; 210/694; 423/25; 423/29; 423/236; 423/368; 423/378; 423/407
[58] Field of Search .......................... 75/421, 422, 423, 75/426, 427, 428, 721, 729, 732, 735, 737, 744; 210/684, 685, 694, 904; 423/25, 29, 236, 368, 378, 407

[56] References Cited

U.S. PATENT DOCUMENTS

| 3,271,135 | 9/1966 | Davidoff | 75/106 |
|---|---|---|---|
| 3,935,006 | 1/1976 | Fischer | 75/118 R |
| 4,208,378 | 6/1980 | Heinen et al. | 423/27 |
| 4,816,235 | 3/1989 | Pesic | 423/32 |
| 4,968,346 | 11/1990 | Belsak et al. | 423/29 |
| 5,073,354 | 12/1991 | Fuller et al. | 423/24 |
| 5,176,886 | 1/1993 | Darnall et al. | 423/29 |
| 5,178,665 | 1/1993 | Haque | 75/428 |
| 5,228,903 | 7/1993 | O'Keefe | 75/743 |

FOREIGN PATENT DOCUMENTS

| 0 010 367 | 9/1979 | European Pat. Off. |
| 90 00206 | 1/1990 | WIPO |
| 90/00206 | 1/1990 | WIPO |
| 92 08812 | 5/1992 | WIPO |
| 92/08812 | 5/1992 | WIPO |

OTHER PUBLICATIONS

H.J. Heinen et al., "*Gold Desorption from Activated Carbon with Alkaline Alcohol Solutions*" pp. 551–563

John L. Fast., "*Glycol Stripping a Viable Option For Recovering Gold from Carbon*" Jun. 1987., pp. 48–49.

J.B. Zadra et al. "*Process for Recovering Gold and Silver from Activated Carbon by Leaching and Electrolysis*", 1952., pp. 1–32.

F. Espiell et al., "*Gold Desorption from Activated Carbon with Dilute NaOH/Organic Solvent Mixture*", 1988, pp. 321–333.

D.M. Muir et al. "*Elution Of Gold from Carbon by The Micron Solvent Distillation Procedure*"., 1985., 151–169.

R.J. Davidson et al., "*The Elution ff Gold from Activated Carbon Using Deionized Water.*" Jul. 1977., pp. 939–946.

J. Richard Ross., "*Extractive Metallurgy*" Feb. 1, 1974.

R.J. Davidson et al., "*Further Studies on the Elution of Gold from Activated Carbon Using Water as the Eluant*"., Oct. 1979., pp. 437–445.

Ross, J. Richard, "Desorbing Gold from Activated Carbon" U.S. Pat. application 74/438906, Abstract, Feb. 1, 1974.

*Primary Examiner*—David A. Simmons
*Assistant Examiner*—M. Alexandra Elve
*Attorney, Agent, or Firm*—Antonelli, Terry, Stout & Kraus, LLP

[57] ABSTRACT

A powerful reducing agent such as hydrazine monohydrate is added to the standard eluent solutions such as NsOH-NaCN with or without alcohol. The kinetics of elution of gold or of silver are thus markedly enhanced.

50 Claims, 9 Drawing Sheets

PROCESS FOR THE ELUTION OF PRECIOUS METALS ABSORBED ON ACTIVE CARBON

FIELD OF THE INVENTION

The present invention relates to a process for eluting gold and/or silver which are adsorbed on activated carbon by direct elution or by elution with presoaking, the direct elution comprising bringing the carbon into contact with an eluent solution containing a cyanide and/or a base and optionally an organic solvent, in conditions such that the carbon is at least partially stripped, thus producing a gold-bearing and/or silver-bearing eluate, and the elution with presoaking comprising bringing the carbon into contact with a presoaking solution containing a cyanide and/or a base and optionally an organic solvent, so as to produce presoaked carbon which is more suited to being eluted and a spent presoaking solution, and bringing the presoaked carbon into contact with an aqueous or organic eluent in conditions such that the presoaked carbon is at least partially stripped, thus producing a gold-bearing and/or silver-bearing eluate, the presence of cyanide in the eluent solution or the presoaking solution being obligatory if one wishes to elute silver.

BACKGROUND OF THE RELATED ART

Many processes of this kind are already known, especially the Zadra process, the Zadra process under pressure and the Zadra process using organic solvents, all of which work by direct elution, and the AARL and Micron Research processes, which make use of presoaking before elution.

In the Zadra process (J. B. Zadra et al., 1952. A process for recovering gold and silver from activated carbon by leaching and electrolysis. U.S. Bur. Mines, Rep. Invest. No 4843) the eluent solution contains approximately 10 g/l NaOH and 1 g/l NaCN, although these concentrations can vary from one plant to another. The elution temperature varies between 80° and 97° C. and the duration between 48 and 70 hours. This process has the advantage of operating at atmospheric pressure at relatively moderate temperatures without any flammable solvent. The big disadvantage is the excessive duration.

In the Zadra process under pressure (J. R. Ross et al. Pressure stripping gold from activated carbon. Paper presented at the Annual Conference, Society Mining Engineers AIME, Chicago Ill., Feb. 26–Mar. 1, 1973, 14 pp.) an elution temperature higher than 100° C. and an appropriate pressure enable the duration of the elution to be shortened to 24 or even 10 hours. However, this elution time is still relatively long.

Insofar as the Zadra process using organic solvents is concerned, the following conditions may be considered ideal: Zadra NaCN—NaOH eluent solution with 20% by volume of an alcohol such as ethanol; duration from 6 to 8 hours; temperature from 80° to 90° C. (U.S. Pat. 4,208,378 and H. J. Heinen et al., 1976. Gold desorption from activated carbon with alkaline alcohol solution; in: A. Weiss (ed.), World Mining and Metals Technology, vol. 1, A.I.M.E., New York, chap. 33, pp. 551–564). In this process the replacement of ethanol with a less flammable glycol is accompanied by an appreciable increase in the duration of elution (J. L. Fast: Glycol stripping. A viable option for recovering gold from carbon. Engineering and Mining Journal, 1987, pp. 48–49). Other solvents that can be employed are acetone and acetonitrile (F. Espiell et al., 1988. Gold desorption from activated carbon with dilute NaOH-organic solvent mixtures. Hydrometallurgy, 19, pp. 321–333).

In the AARL process the carbon is soaked in a solution containing 2–3% NaCN and 2% NaOH for 30 minutes and the actual elution is done with the aid of soft water of very high quality at 110° C. The complete cycle takes from 10 to 11 h. (R. J. Davidson et al., 1977. Desorption of gold from activated carbon with deionised water. J. South Afr. Inst. Min. Metall., 77 (12); pp. 254 and R. J. Davidson et al., 1979. Further studies on the elution of gold from activated carbon using water as the eluant. J. South Afr. Inst. Min. Metall., 79 (19); pp. 437–495).

In the Micron Research process the carbon is presoaked with 0.5 to 1 bed volume of solution containing 5% NaCN and 1% NaOH and then 0.5 bed volume of pure methanol is added, which is refluxed through the carbon bed for 6 to 12 h to elute the gold (D. M. Muir et al. , 1985. Elution of gold from carbon by the Micron solvent distillation procedure. Hydro-metallurgy, 14, pp. 151–169).

Other known processes deal with the use of eluent solutions and of presoaking solutions of the NaCN—NaOH type with a low alcohol content, e. g. 3% (see, respectively, U.S. Pat. No. 4,968,346 and EP-A-0010367).

It is obviously desirable to achieve a reduction in the duration and/or the temperature of elution in each of these known processes.

The objective of the present invention is to provide a process as defined above, which meets this objective.

SUMMARY OF THE INVENTION

To this end, according to the invention, when operating by direct elution, an appropriate quantity of an appropriate reducing agent is added to the eluent solution or to a part of the latter so as to make this solution or part of solution so reductive that the potential of the eluate is at least 50 mV and, preferably, at least 150 mV lower than a reference potential, the latter being the potential measured in the eluate which is obtained without addition of the reducing agent to the eluent solution and, when operating by elution with presoaking, an appropriate quantity of an appropriate reducing agent is added to the presoaking solution so as to make this solution so reductive that the potential of the spent presoaking solution is at least 100 mV and preferably at least 250 mV lower than a reference potential which is the potential measured in the spent presoaking solution which is obtained without addition of the reducing agent to the presoaking solution.

DETAILED DESCRIPTION OF THE PREFERRED EMBODIMENTS

The Applicant Company has found, indeed, that a substantial increase, as defined above, in the reducing power of the eluent and presoaking solutions employed hitherto markedly enhances the kinetics of elution of gold and of silver, as will be demonstrated later.

The process of the invention can therefore be easily applied in plants which utilize the known processes at the present time. For example, when it is a question of adapting to the process of the invention an existing plant of the Zadra type in which the elution is performed, for example, with 20 g/l NaOH and 3 g/l NaCN at 90° C., it suffices to measure the potential of the eluate, and then to determine the nature and the quantity of the reducing agent to be added to the eluent solution for the potential of the eluate to drop by at least 50 mV, and to continue using the plant with the eluent solution with increased reducing power, in conditions which are, of course, adapted to the increased eluting power of the eluent solution. It goes without saying that in this procedure the potential of the eluate must always be measured at the same temperature, for example at 20° C., and at the same pH. (The expression "the potential" employed in the present application is to be understood to mean the redox potential).

Sodium borohydride, hydrazine sulphate, hydroxylamine hydrochloride and formaldehyde can be employed as reducing agent. However, preference is given to hydrazine, which is generally commercialized in the form of monohydrate, because this reactant gives the best results, as follows from a series of comparative tests the results of which are recorded in Table I below. These tests were carried out with carbon laden with 0.4% of gold in the laboratory, in conditions simulating a batch in the Zadra process, namely: 15 g of carbon per 100 ml of solution containing 5 g/l NaCN, heating under reflux with stirring at 100° C., duration of 1 hour starting from boiling, the reactant being added in one lot at the beginning of the test.

TABLE I

Comparison of different reducing agents

| Test No. | NaCN g/l | Other reactant | | Contents g/l | Au Yield % |
|---|---|---|---|---|---|
| | | Name | Formula | | |
| 1 | 5 | | | | 20.1 |
| 2 | 5 | Hydrazine monohydrate | $N_2H_4 \cdot H_2O$ | 0.5 | 39.4 |
| 3 | 5 | Hydrazine monohydrate | | 1.0 | 46.2 |
| 4 | 5 | Sodium borohydride | $NaBH_4$ | 5 | 36.4 |
| 5 | 5 | Sodium borohydride | | 1 | 31.3 |
| 6 | 5 | Hydrazine sulphate | $N_2H_4 \cdot H_2SO_4$ | 1 | 22.4 |
| 7 | 5 | Hydrazine sulphate | | 5 | 29.8 |
| 8 | 5 | Hydroxylamine hydrochloride | $H_2NOH \cdot HCl$ | 5 | 30.6 |
| 9 | 5 | Hydroxylamine hydrochloride | | 1 | 21.2 |
| 10 | 5 | Formaldehyde | HCHO | 1 | 14.8 |
| 11 | 5 | " | | 5 | 26.2 |
| 12 | 0 | Sodium hydroxide | NaOH | 5 | 15.6 |

In general the direct elution will be performed by passing an appropriate number of bed volumes of the eluent solution through a bed of the carbon to be stripped contained in a column and by collecting the eluate at the exit of this column, as is also done in the direct elution processes of the prior art. When working in this manner it may be useful to decrease the concentration of the reducing agent in the eluent solution as a function of time and possibly to eliminate the addition of reducing agent in the final bed volumes, this being with a view to reducing the consumption of reducing agent. It may also be useful to recycle the eluate fractions which are poor in gold and/or with an appreciable content of reducing agent, this being with a view to further reducing the consumption of reducing agent and to producing an eluate with a higher gold content. However, it may also be advisable to increase the concentration of the reducing agent in the eluent solution as a function of time and possibly to eliminate the addition of reducing agent in the initial bed volumes, especially when it is of importance that the eluate should always have substantially the same precious metals content. The temperature of the eluent solution may also be increased as a function of time for the same purpose, optionally in combination with an increase in the concentration of the reducing agent.

When operating by direct elution and when the carbon to be treated contains gold and no silver, an eluent solution may be employed containing, besides the reducing agent, only a small quantity of $OH^-$, preferably not more than 4.25 g/l $OH^-$, in the form of NaOH, KOH or an equivalent base; it may, however, be useful to add a small quantity of $CN^-$ to this solution, preferably not more than 2.70 g/l $CN^-$, in the form of NaCN, KCN or an equivalent cyanide.

When the carbon to be treated contains gold and silver it is possible to employ an eluent solution containing, besides the reducing agent, only a quantity of $CN^-$ of at least 1.00 g/l and a quantity of $OH^-$ not exceeding 4.25 g/l, the preferential $CN^-$ and $OH^-$ contents being $\geq 2.65$ g/l and $\leq 2.13$ g/l respectively.

It should be noted, however, that for safety reasons the pH should be at least equal to 9 in the presence of cyanide.

When the eluent solution contains cyanide, especially $\geq 2.65$ g/l of $CN^-$, the silver is in general eluted more easily than the gold, that is to say at lower temperature and/or with a less reductive eluent solution. It is therefore possible to elute the silver and the gold selectively by adjusting the reducing power and/or the temperature of the eluent solution as a function of time so as to collect most of the silver in the initial bed volumes and most of the gold in the other bed volumes. This will facilitate the subsequent recovery of these metals, for example the recovery of silver in the form of $Ag_2S$ and the recovery of gold in the form of a cathodic deposit. The selective elution of silver may be optionally performed without addition of reducing agent to the eluent solution.

When the carbon to be treated contains oxidized impurities and/or radicals it may be useful to "neutralize" these first of all with an inexpensive reducing agent such as formaldehyde or sodium sulphite before undertaking the elution or the presoaking with a solution containing a more costly reducing agent such as hydrazine monohydrate.

In a first embodiment of the process of the invention a standard NaCN—NaOH eluent solution of the Zadra type is employed, to which 0.05–10 g/l, preferably 0.1–1 g/l of hydrazine monohydrate has been added, and the elution is performed under pressure at 110°–130° C.

In a second embodiment of the process of the invention the solution of the first embodiment is employed, but the elution is performed at atmospheric pressure at 40°–100° C., preferably at 60°–100° C. and, most advantageously, at 80°–100° C.

In a third embodiment of the process of the invention a NaCN—NaOH-alcohol (ethanol, butanol, etc.) eluent solution of the Zadra type using organic solvents is employed, to which 0.05–10 g/l, preferably 0.1–0.5 g/l of hydrazine monohydrate has been added, and elution is carried out at 80°–90° C.

In these three embodiments the concentration of hydrazine in the eluent solution can be varied as a function of time and the addition of hydrazine may be optionally eliminated either in the initial bed volumes or in the final ones.

In a fourth embodiment of the process of the invention a NaCN—NaOH presoaking solution of the AARL or Micron Research type is employed, to which 5–20 g/l of hydrazine monohydrate has been added, and the presoaking and the elution are performed as is done in the AARL or Micron Research process.

It should be noted that the presence of hydrazine in the eluate does not prevent the subsequent recovery of the gold by cementation on zinc powder but, on the contrary, enables the consumption of the zinc powder to be limited.

An alternative form of the process of the invention consists in that, instead of adding reducing agent to the eluent solution or to the presoaking solution, the elution or the presoaking is performed in the cathode compartment of a cell containing diaphragms, where a reducing potential equivalent to that created by the said addition is obtained by adjusting the current intensity through the cell.

The advantages of the process of the invention will now be illustrated by the description of two series of comparative tests of batchwise elution. These tests are based on a standard ACIX test traditionally employed in South Africa to define the suitability of a laden carbon for being eluted in an industrial Zadra system. This test consists in subjecting 1 g of laden carbon to leaching at 100° C. under reflux for one hour with the aid of 200 ml of a solution containing 5 g/l NaCN.

All the tests were carried out with an industrial carbon laden with 0.445% of gold and 0.37% of silver.

In the first series of tests the elution kinetics of the gold and of the silver were determined with the standard solution containing 5 g/l NaCN, a solution containing 5 g/l NaCN and 0.5 g/l $N_2H_4 \cdot H_2O$ and a solution containing 5 g/l NaCN and 0.2 g/l $N_2H_4 \cdot H_2O$. The carbon and the solution are heated together to boiling under reflux and the duration of the tests is counted from the moment when boiling is reached.

The operating conditions and the results of these tests are given in Table II below.

TABLE II

| | | Zadra simulation tests | | | | |
|---|---|---|---|---|---|---|
| | | | Eluent solutions | | | |
| Carbon | Duration | Volume | NaCN | $N_2H_4 \cdot H_2O$ | Yields | |
| mass g | min. | ml | g/l | g/l | Au % | Ag % |
| 1 | 10 | 200 | 5 | 0 | 37.5 | 63.4 |
| | 20 | | | | 44.8 | 71.1 |
| | 30 | | | | 61.7 | 82.5 |
| | 40 | | | | 59.6 | 84.4 |
| | 50 | | | | 64.4 | 90.1 |
| | 60 | | | | 77.0 | 91.4 |
| | 90 | | | | 80.2 | 100 |
| 1 | 10 | 200 | 5 | 0.5 | 71.7 | 87.6 |
| | 15 | | | | 74.4 | 93.9 |
| | 20 | | | | 82.8 | 93.9 |
| | 30 | | | | 87.6 | 98.3 |
| | 40 | | | | 92.8 | 100 |
| | 60 | | | | 97.6 | 100 |
| 1 | 10 | 200 | 5 | 0.2 | 57.0 | 81.2 |
| | 20 | | | | 64.9 | 87.6 |
| | 30 | | | | 72.3 | 88.2 |
| | 40 | | | | 87.6 | 97.7 |
| | 50 | | | | 89.7 | 100 |
| | 60 | | | | 98.6 | 100 |

These results clearly show that the addition of hydrazine considerably improves the elution of the gold: after 10 minutes' elution the gold yield changes in fact from 37.5% to 57.0 and 71.7% respectively, depending on whether the addition of hydrazine mono-hydrate has amounted to 0.2 or 0.5 g/l; after 60 minutes more than 97.5% is eluted, whereas without hydrazine the gold yield does not exceed 80.2% after 90 minutes.

There is an appreciable gain in kinetics in the case of the silver as well.

In the second series of comparative tests the effect of an addition of hydrazine on the presoaking was examined.

The presoaking was carried out for 15 minutes at ambient temperature with 75 ml of solution per 15 g of carbon. The elution was then performed with the aid of 100 ml of solution containing 5 g/l NaCN, for 1 hour, with boiling under reflux.

Table III below gives the operation conditions and the results of the tests. In it, they are compared with those of a direct elution test, without presoaking, with the aid of a solution containing 5 g/l NaCN.

TABLE III

| | Tests on elution with presoaking | | | | |
|---|---|---|---|---|---|
| Carbon mass g | 15 | 15 | 15 | 15 | 15 |
| Presoaking solution | | | | | |
| NaCN g/l | none | 5.0 | 5.0 | 5.0 | 5.0 |
| $N_2H_4 \cdot H_2O$ g/l | | 0.0 | 0.8 | 2.7 | 8.0 |
| Elution | | | | | |
| Volume ml | 100 | 100 | 100 | 100 | 100 |
| NaCN g/l | 5.0 | 5.0 | 5.0 | 5.0 | 5.0 |
| Yield % | | | | | |
| Au | 15.2 | 16.2 | 20.4 | 30.9 | 50.5 |
| Ag | 51.9 | 53.2 | 59.1 | 69.3 | 85.5 |

These tests show that presoaking with a solution containing only cyanide does not permit any appreciable improvement in the gold or silver elution yields. On the other hand, when the presoaking solution also contains hydrazine monohydrate, the elution becomes increasingly efficient as the concentration of $N_2H_4 \cdot H_2O$ increases.

The advantages of the process of the invention are illustrated further by the following description of five series of comparative tests on elution in a column.

These tests were carried out under the following general conditions:
 column which has a working volume of 1 litre (diameter 66 mm, height 292 mm),
 wet carbon volume 1 l,
 solution flow rate 2 l/h, which corresponds to 2 bed volumes/h.

Figure 1:
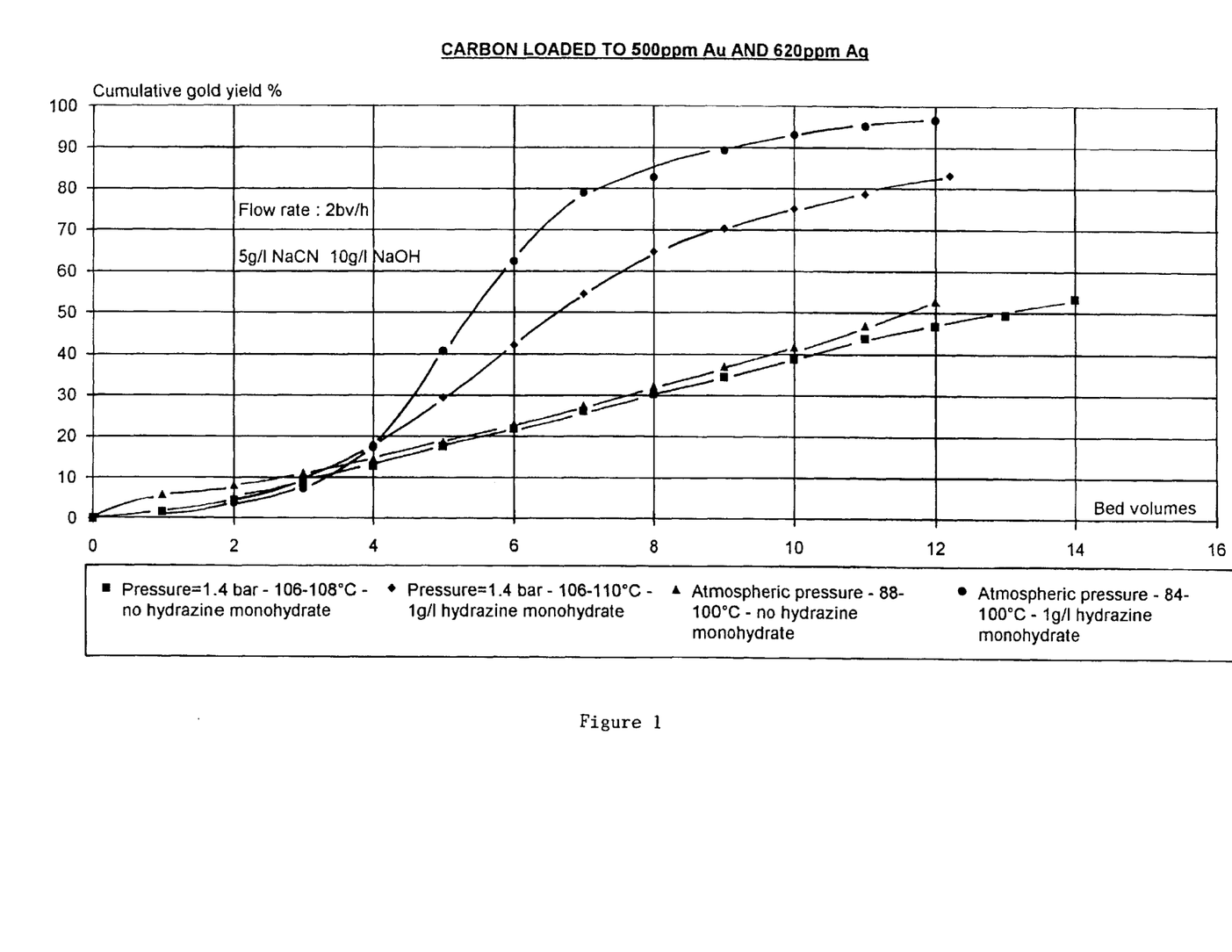
Figure 2:
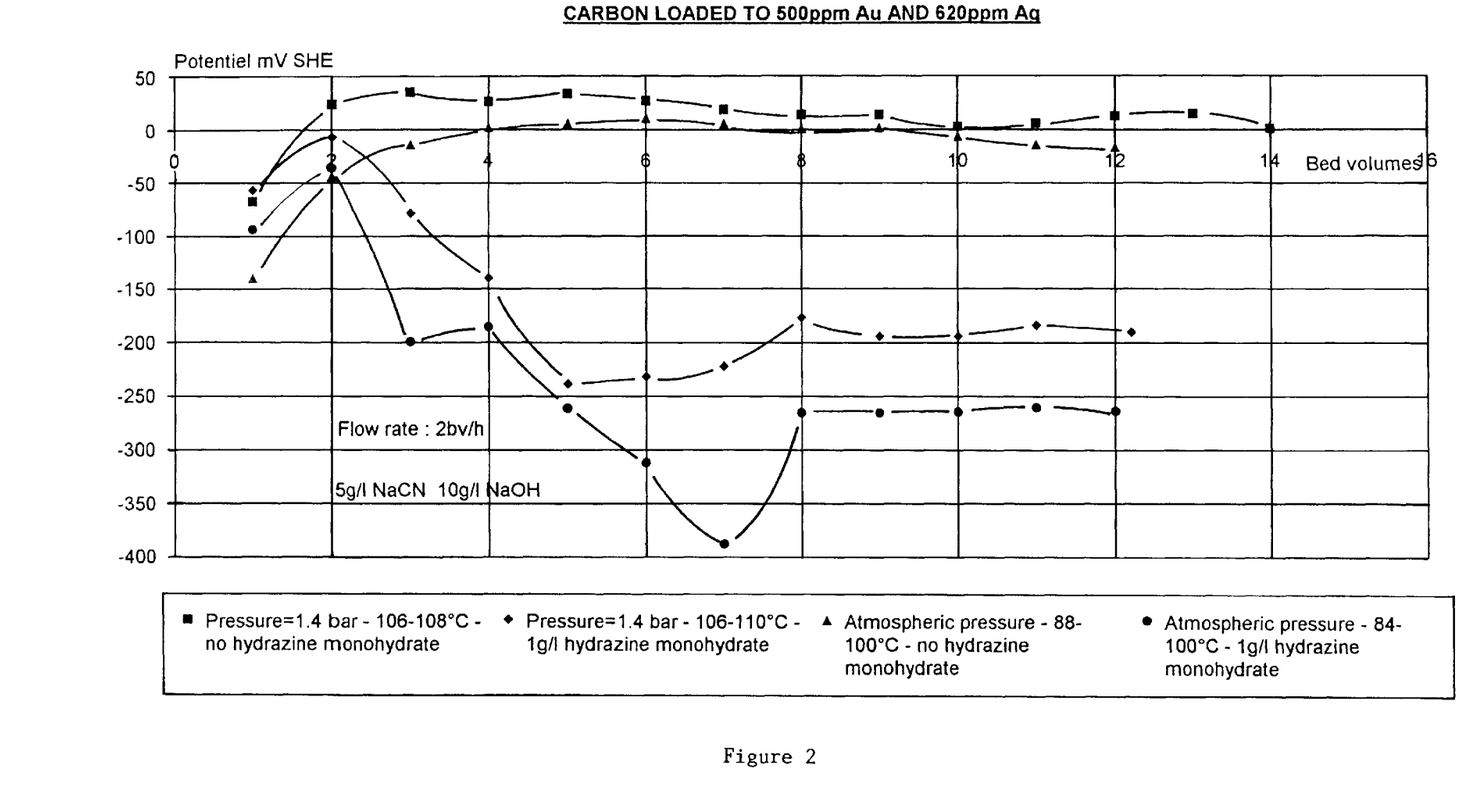

The first series of tests was carried out with an industrial carbon laden with 500 ppm Au and 620 ppm Ag and with an eluent solution containing 10 g/l NaOH, 5 g/l NaCN and 0 or 1 g/l of hydrazine monohydrate. Two tests took place at atmospheric pressure at about 85°–100° C. and two others at a pressure of 1.4 bar at about 106°–110° C., each time in the absence and in the presence of 1 g/l of hydrazine monohydrate.

The Au elution yield was determined as a function of the number of bed volumes and the potential of each bed volume of eluate was measured at 20° C.

The change in the Au elution yield is given in FIG. 1 and that in the potential in FIG. 2.

Figure 3:
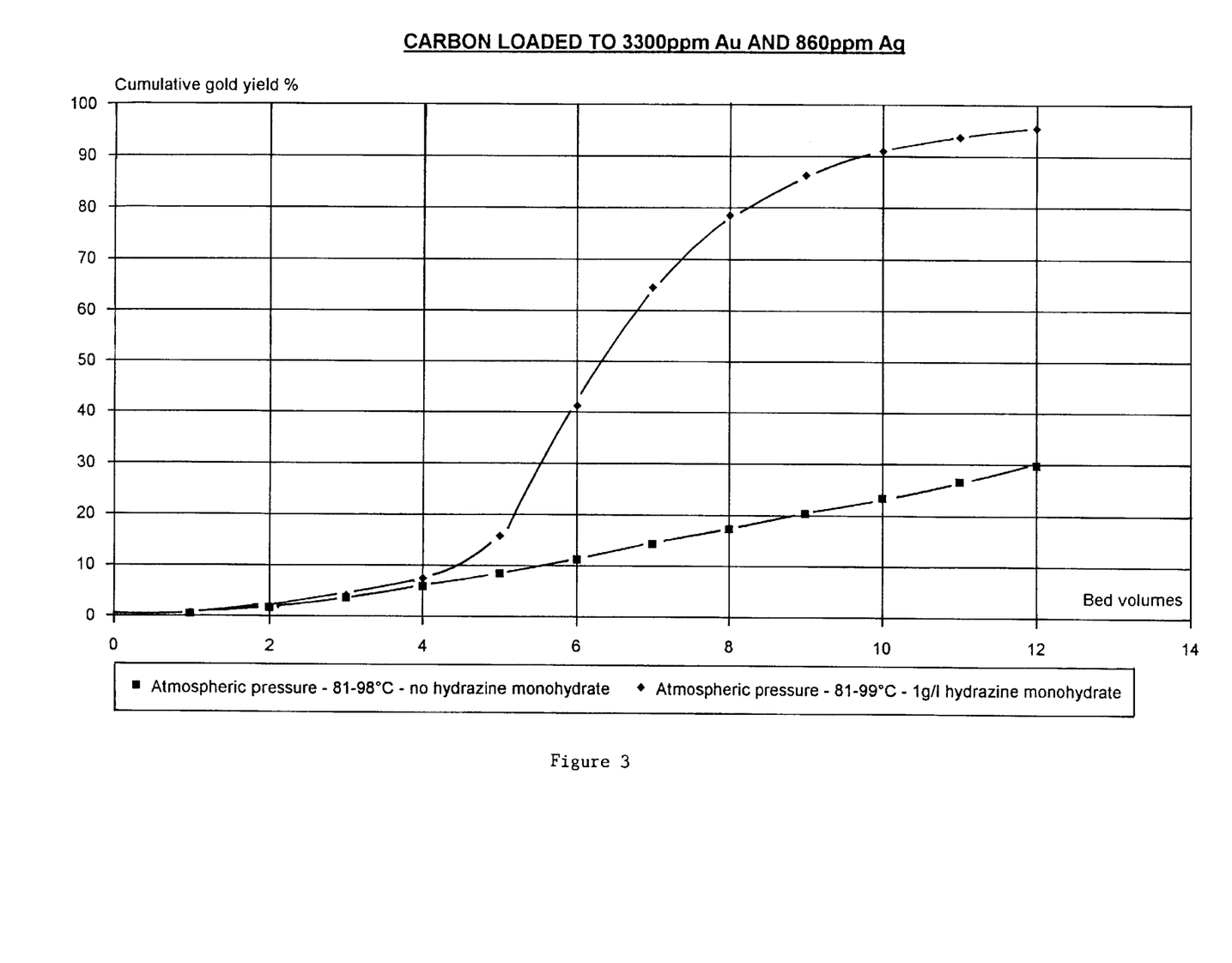
Figure 4:
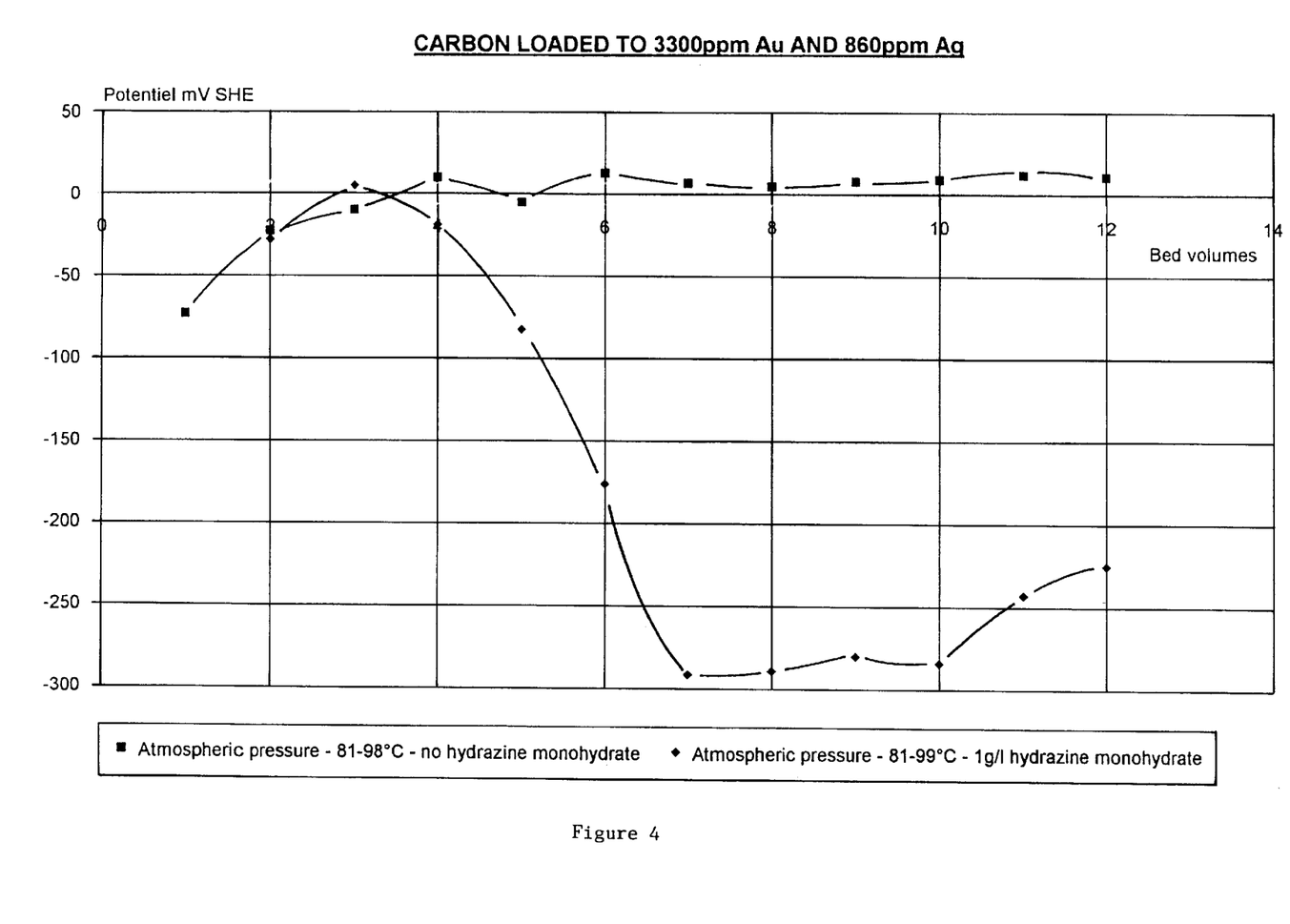

The second series of tests was carried out at atmospheric pressure at about 81°–99° C. with a carbon laden with 3,300 ppm Au and 860 ppm Ag and with the eluent solution of the first series.

The Au yield was determined and the potential measured as in the first series of tests: the change in the Au elution yield is given in FIG. 3 and that in the potential in FIG. 4.

Figure 5:
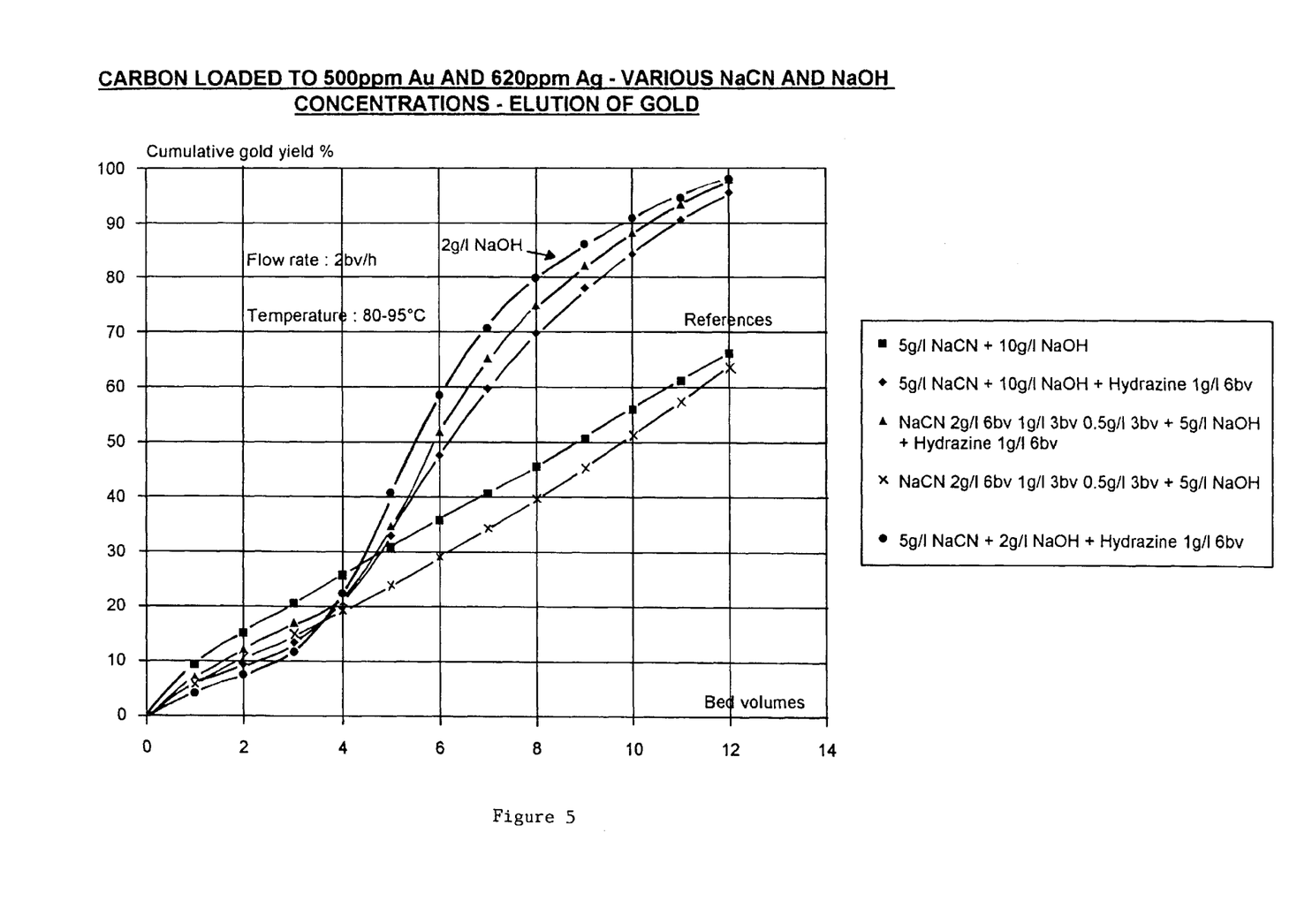
Figure 6:
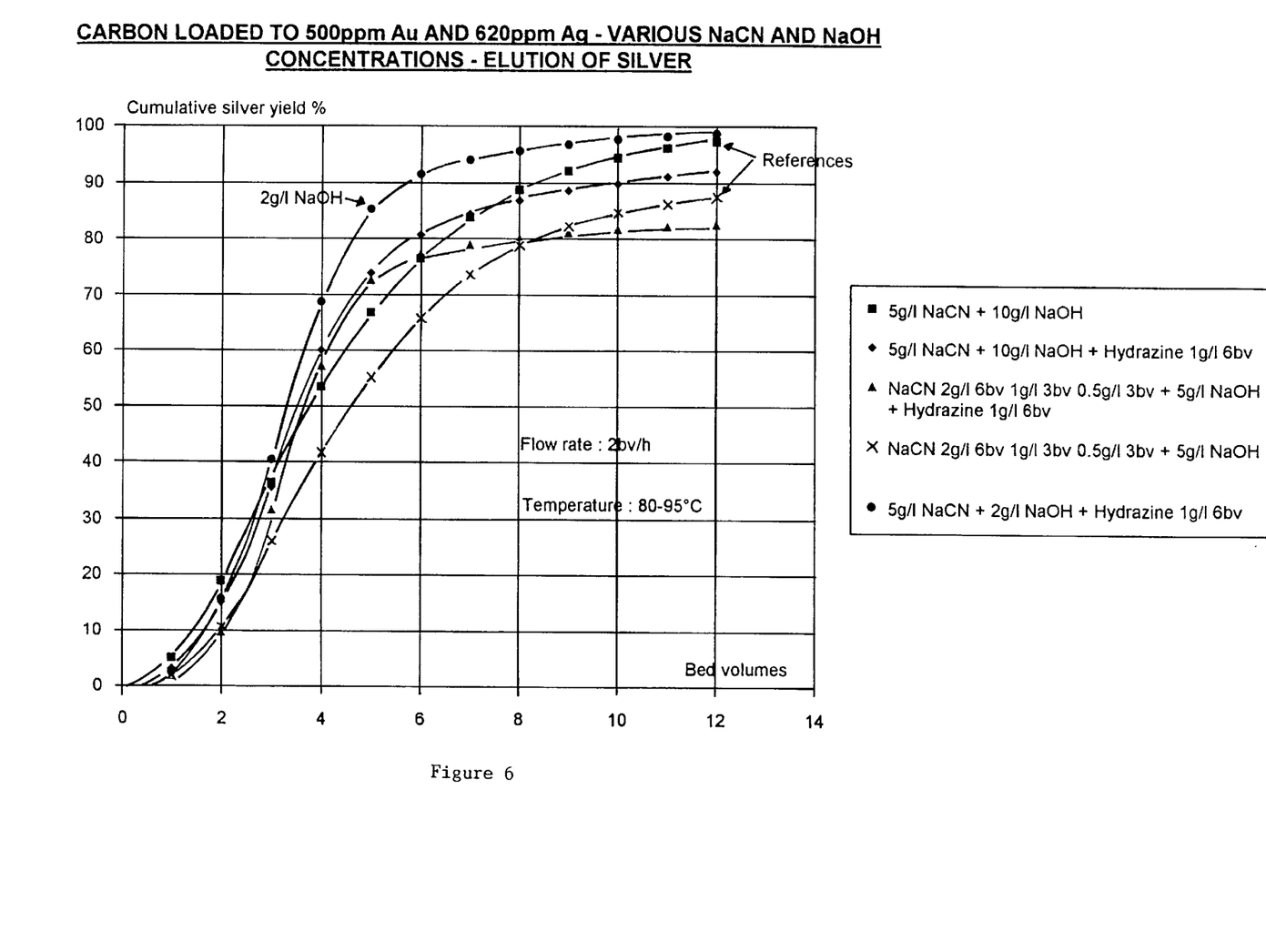

The third series of tests was carried out with an industrial carbon laden with 500 ppm Au and 620 ppm Ag and with an eluent solution with variable contents of NaOH and NaCN and containing either 0 g/l or 1 g/l of hydrazine monohydrate during the first 6 bed volumes. The 5 tests took place at atmospheric pressure at about 85°–100° C. The Au and Ag elution yields were determined as a function of the number of bed volumes. The results are given in FIGS. 5 and 6.

Figure 7:
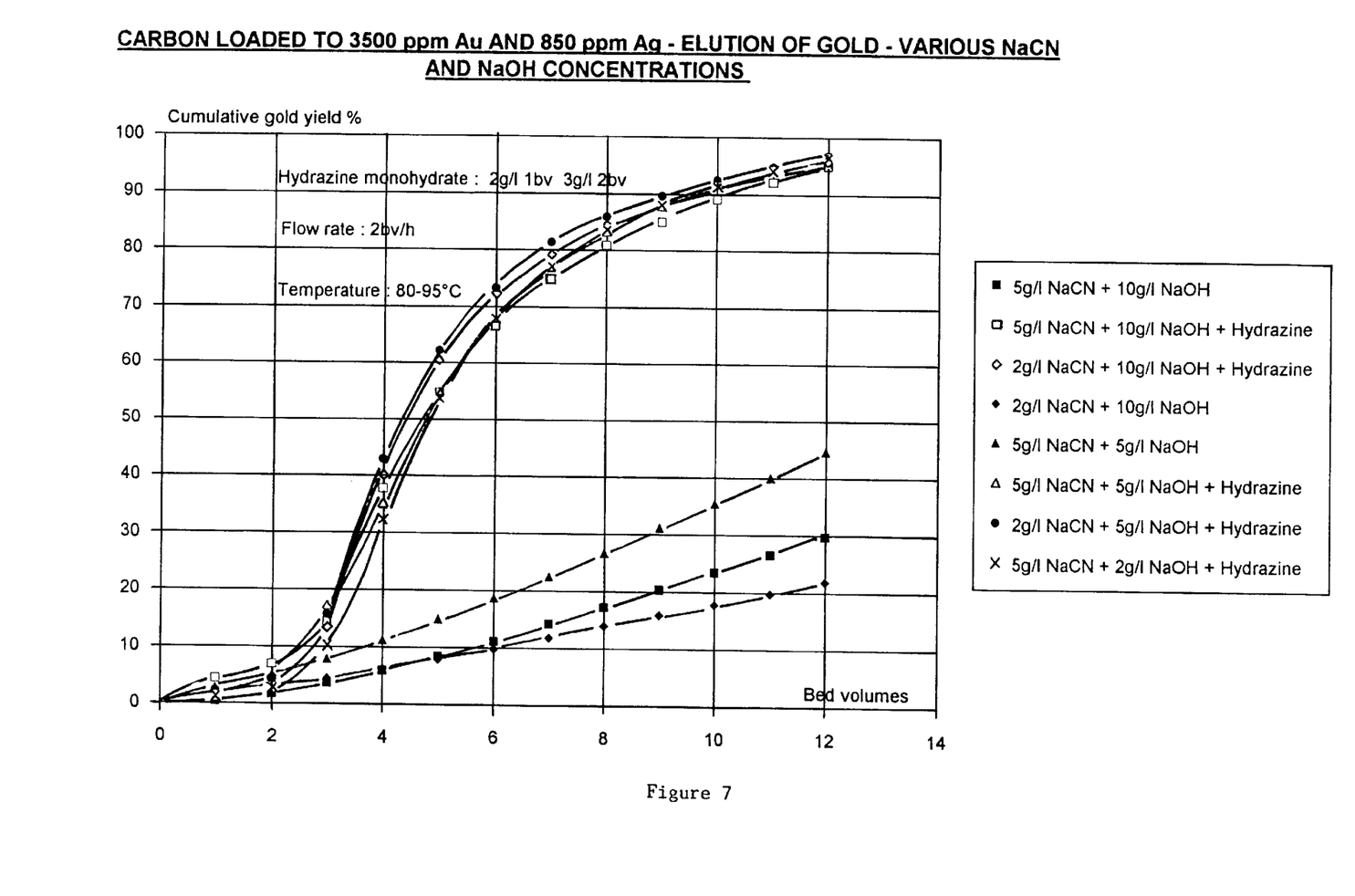
Figure 8:
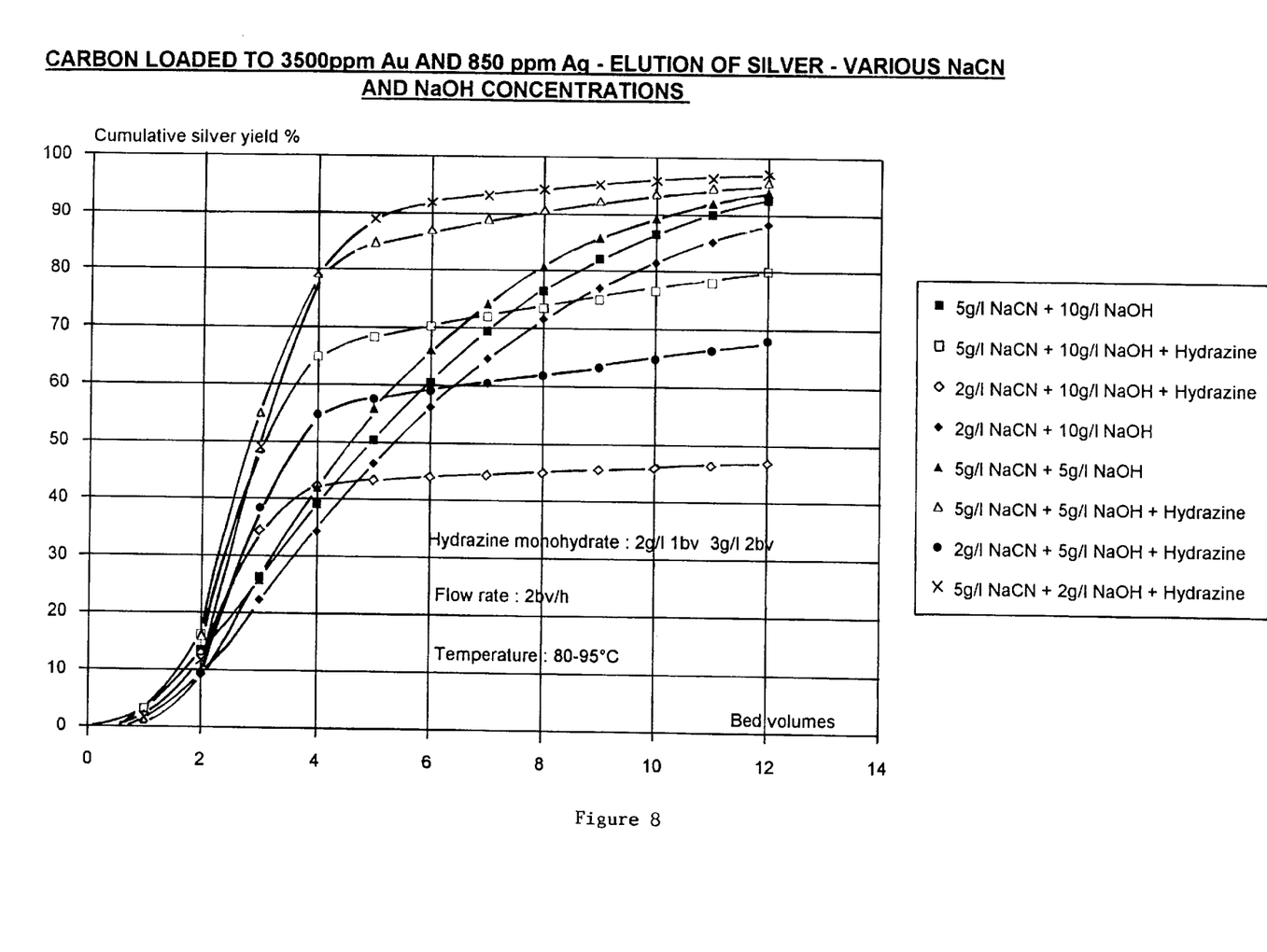

The fourth series of tests was carried out with an industrial carbon laden with 3,300 ppm Au and 860 ppm Ag. The elutions took place at about 80°–95° C. at atmospheric pressure with an eluent solution with variable contents of NaOH and NaCN and containing either 0 g/l or 2 g/l of hydrazine monohydrate during the first bed volume and 3 g/l during the following two bed volumes.

The Au and Ag elution yields were determined as in the third series of tests and these results are given in FIGS. 7 and 8.

Figure 9:
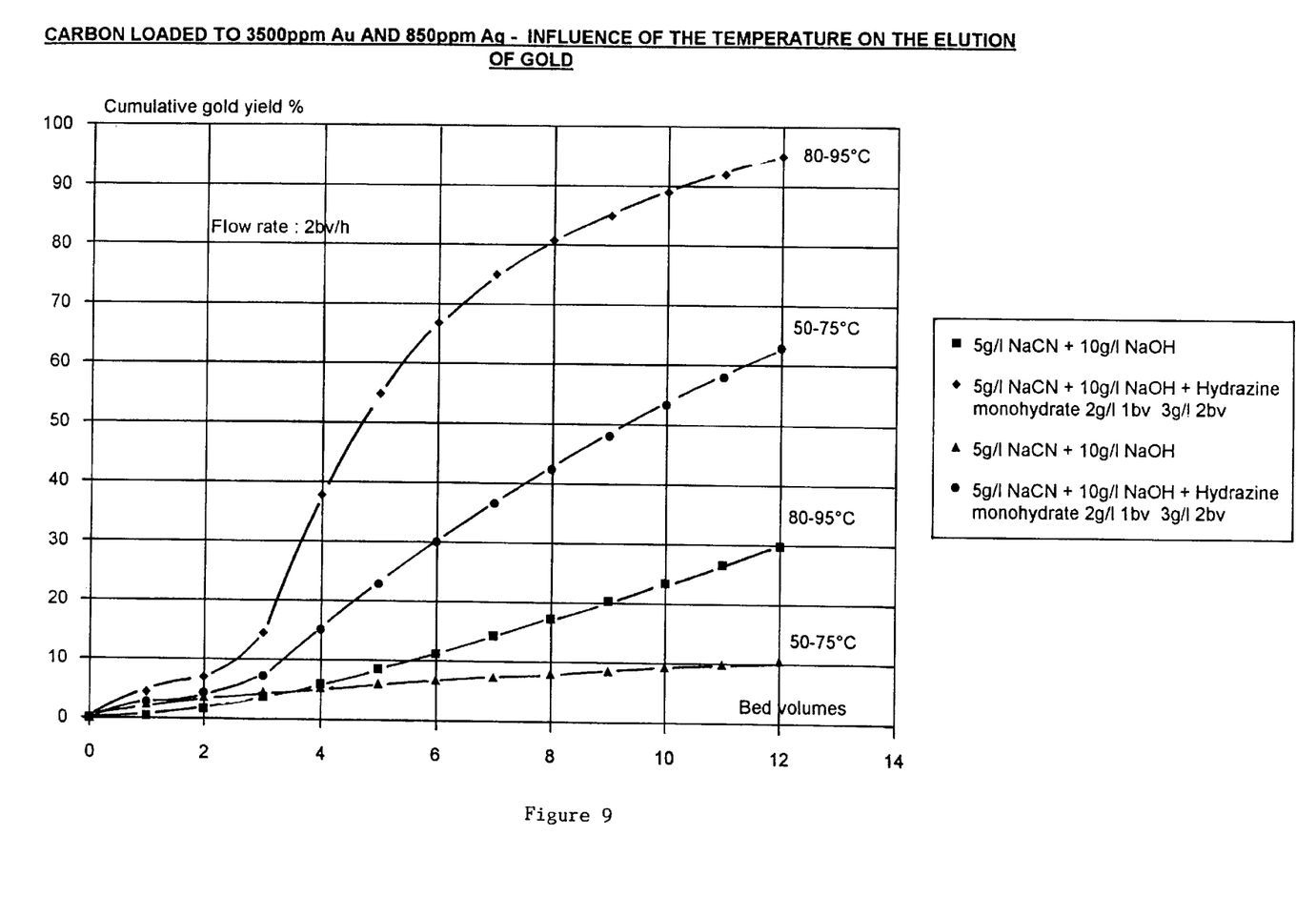

The fifth series of tests was carried out with an industrial carbon laden with 3,500 ppm Au and 850 ppm Ag. Four tests took place at atmospheric pressure: two at about 50°–75° C. and two others at about 80°–95° C., with an eluent solution containing 10 g/l NaOH, 5 g/l NaCN and either 0 g/l or 2 g/l of hydrazine monohydrate during the first bed volume and 3 g/l during the following two bed volumes.

The Au elution yield was determined as a function of the number of bed volumes. The results are given in FIG. 9.

These results again illustrate the advantage of the addition of hydrazine monohydrate to the eluent solution. This addition is more effective at lower temperature, where the reducing power of the solution is higher. In the presence of silver it is advantageous to employ eluent solutions with a low NaOH content, preferably solutions with pH in the region of 9.

Although the present invention has been described and illustrated in detail, it should be clearly understood that the same is by way of illustration and example only and is not to be taken by way of limitation, the spirit and scope of the present invention being limited only by the terms of the appended claims.

We claim:

1. A process for eluting gold adsorbed activated carbon, comprising the steps of:

providing an eluent solution containing at least one of a cyanide and a base, and optionally an organic solution, said eluent solution possessing a reference electrochemical potential;

contacting said gold-adsorbed activated carbon with said eluent solution, whereby the carbon is at least partially stripped of its gold content to produce a gold-bearing eluate; and providing one of said eluent solution or said gold-bearing eluate with a reducing agent in a quantity sufficient to lower the electrochemical potential of said eluent solution or said gold-bearing eluate to at least 50 mV below said reference electrochemical potential.

2. The process according to claim 1, wherein:

the reducing agent comprises one of the group consisting of hydrazine monohydrate, sodium borohydride, hydrazine sulphate, hydroxylamine hydrochloride and formaldehyde.

3. The process according to claim 1, wherein:

an eluent solution is employed containing 0.05–10 g/l of hydrazine monohydrate.

4. The process according to claim 2, wherein:

an eluent solution free from organic solvents is employed and the elution is performed at atmospheric pressure at 40°–100° C.

5. The process according to claim 1, wherein:

the activated carbon is substantially free from silver, and wherein the eluent solution contains not more than 4.25 g/l $OH^-$, derived from one of NaOH, KOH or an equivalent base material.

6. The process according to claim 5, wherein:

a quantity of $CN^-$ not exceeding 2.70 g/l, is provided by NaCN, KCN or an equivalent cyanide added to the eluent solution.

7. The process according to claim 1, wherein:

the activated carbon also contains adsorbed silver, wherein the eluent solution contains not more than 4.25 g/l derived from NaOH, KOH or an equivalent base material; and at least 1.00 g/l $CN^-$ is provided by one of NaCN, KCN or an equivalent cyanide.

8. The process according to claim 7, wherein:

the pH of the eluent solution is at least equal to 9.

9. The process according to claim 1, wherein:

elution is performed by passing a quantity of the eluent solution through a carbon bed contained in a column and by collecting the eluate at an exit of said column.

10. The process according to claim 9, wherein:

a concentration of the reducing agent in the eluent solution is varied as a function of time.

11. The process according to claim 10, wherein:

the concentration of the reducing agent in the eluent solution is 0.0 g/l either in an initial stage or in a final stage of the elution.

12. The process according to claim 3, wherein:

the gold-adsorbed activated carbon contains at least one of oxidized impurities and radicals; and the gold-adsorbed activated carbon is brought into contact with a reducing agent other than hydrazine monohydrate before the elution.

13. The process according to claim 12, wherein:

the gold-adsorbed activated carbon is brought into contact with a solution of one of formaldehyde or sodium sulphite.

14. The process according to claim 1, wherein:

the elution step is performed in a cathode compartment of a cell containing diaphragms, where a reducing potential equivalent to that created by said addition of said reducing agent is obtained by adjusting a current intensity through the cell.

15. A process for eluting silver adsorbed activated carbon, comprising the steps of:

providing an eluent solution containing at least one of a cyanide and a base, and optionally an organic solution, said eluent solution possessing a reference electrochemical potential;

contacting said silver-adsorbed activated carbon with said eluent solution, whereby the carbon is at least partially stripped of its silver content to produce a silver-bearing eluate; and providing one of said eluent solution or said silver-bearing eluate with a reducing agent in a quantity sufficient to lower the electrochemical potential of said eluent solution or said silver-bearing eluate to at least 50 mV below said reference electrochemical potential.

16. A process for eluting gold adsorbed activated carbon, comprising the steps of:

providing a presoaking solution containing at least one of a cyanide and a base, and optionally an organic solution, whereby the gold-adsorbed activated carbon is presoaked and leaves a spent presoaking solution having a reference electrochemical potential;

providing an eluent solution comprising one of an aqueous or an organic eluent;

contacting the presoaked gold-adsorbed activated carbon with the eluent solution, whereby the presoaked gold-adsorbed activated carbon is at least partially stripped of its gold content to produce a gold-bearing eluate; and providing a reducing agent in a quantity such that an electrochemical potential of the spent presoaking solution is at least 100 mV lower than said reference electrochemical potential.

17. A process for eluting silver adsorbed activated carbon, comprising the steps of:

providing a presoaking solution containing at least one of a cyanide and a base, and optionally an organic solution, whereby the silver-adsorbed activated carbon is presoaked and leaves a spent presoaking solution having a reference electrochemical potential;

providing an eluent solution comprising one of an aqueous or an organic eluent;

contacting the presoaked silver-adsorbed activated carbon with the eluent solution, whereby the presoaked silver-adsorbed activated carbon is at least partially stripped of its silver content to produce a silver-bearing eluate; and providing a reducing agent in a quantity such that an electrochemical potential of the spent presoaking solution is at least 100 mV lower than said reference electrochemical potential.

18. The process according to claim 15, wherein:
the reducing agent comprises one of the group consisting of hydrazine monohydrate, sodium borohydride, hydrazine sulphate, hydroxylamine hydrochloride and formaldehyde.

19. The process according to claim 15, wherein:
an eluent solution is employed containing 0.05–10 g/l of hydrazine monohydrate.

20. The process according to claim 19, wherein:
an eluent solution free from organic solvents is employed and the elution is performed at atmospheric pressure at 40°–100° C.

21. The process according to claim 15, wherein:
elution is performed by passing a quantity of the eluent solution through a carbon bed contained in a column and by collecting the eluate at an exit of said column.

22. The process according to claim 21, wherein:
a concentration of the reducing agent in the eluent solution is varied as a function of time.

23. The process according to claim 21, wherein:
the concentration of the reducing agent in the eluent solution is 0.0 g/l either in an initial stage or in a final stage of the elution.

24. The process according to claim 19, wherein:
the silver adsorbed activated carbon contains at least one of oxidized impurities and radicals; and
the silver adsorbed activated carbon is brought into contact with a reducing agent other than hydrazine monohydrate before the elution.

25. The process according to claim 24, wherein:
the silver adsorbed activated carbon is brought into contact with a solution of one of formaldehyde or sodium sulphite.

26. The process according to claim 15, wherein:
the elution step is performed in a cathode compartment of a cell containing diaphragms, where a reducing potential equivalent to that created by said addition of said reducing agent is obtained by adjusting a current intensity through the cell.

27. The process according to claim 16, wherein:
the reducing agent comprises one of the group consisting of hydrazine monohydrate, sodium borohydriden, hydrazine sulphate, hydroxylamine hydrochloride and formaldehyde.

28. The process according to claim 16, wherein:
an eluent solution is employed containing 0.05–10 g/1 of hydrazine monohydrate.

29. The process according to claim 27, wherein:
an eluent solution free from organic solvents is employed and the elution is performed at atmospheric pressure at 40°–100° C.

30. The process according to claim 16, wherein:
the activated carbon is substantially free from silver, and wherein the eluent solution contains not more than 4.25 g/l OH$^-$, derived from one of NaOH, KOH or an equivalent base material.

31. The process according to claim 30, wherein:
a quantity of CN$^-$ not exceeding 2.70 gl, is provided by NaCN, KCN or an equivalent cyanide added to the eluent solution.

32. The process according to claim 16, wherein:
the activated carbon also contains adsorbed silver;
wherein the eluent solution contains not more than 4.25 g/l derived from NaOH, KOH or an equivalent base material; and
at least 1.00 g/l CN$^-$ is provided by one of NaCN, KCN or an equivalent cyanide.

33. The process according to claim 31, wherein:
the pH of the eluent solution is at least equal to 9.

34. The process according to claim 16, wherein:
elution is performed by passing a quantity of the eluent solution through a carbon bed contained in a column and by collecting the eluate at an exit of said column.

35. The process according to claim 34, wherein:
a concentration of the reducing agent in the eluent solution is varied as a function of time.

36. The process according to claim 35, wherein:
the concentration of the reducing agent in the eluent solution is 0.0 g/l either in an initial stage or in a final stage of the elution.

37. The process according to claim 16, wherein:
a presoaking solution containing 5–20 g/l of hydrazine monohydrate is employed to presoak the gold-adsorbed activated carbon.

38. The process according to claim 28, wherein:
the gold-adsorbed activated carbon contains at least one of oxidized impurities and radicals; and
the gold adsorbed activated carbon is brought into contact with a reducing agent other than hydrazine monohydrate before the elution.

39. The process according to claim 38, wherein:
the gold-adsorbed activated carbon is brought into contact with a solution of one of formaldehyde or sodium sulphite.

40. The process according to claim 16, wherein:
the elution step is performed in a cathode compartment of a cell containing diaphragms, where a reducing potential equivalent to that created by said addition of said reducing agent is obtained by adjusting a current intensity through the cell.

41. The process according to claim 17, wherein:

the reducing agent comprises one of the group consisting of hydrazine monohydrate, sodium borohydride, hydrazine sulphate, hydroxylamine hydrochloride and formaldehyde.

42. The process according to claim 17, wherein:

an eluent solution is employed containing 0.05–10 g/l of hydrazine monohydrate.

43. The process according to claim 41, wherein:

an eluent solution free from organic solvents is employed and the elution is performed at atmospheric pressure at 40°–100° C.

44. The process according to claim 17, wherein:

elution is performed by passing a quantity of the eluent solution through a carbon bed contained in a column and by collecting the eluate at an exit of said column.

45. The process according to claim 44, wherein:

a concentration of the reducing agent in the eluent solution is varied as a function of time.

46. The process according to claim 45, wherein:

the concentration of the reducing agent in the eluent solution is 0.0 g/l either in an initial stage or in a final stage of the elution.

47. The process according to claim 17, wherein:

a, presoaking solution containing 5–20 g/l of hydrazine monohydrate is employed to presoak the silver-adsorbed activated carbon.

48. The process according to claim 42, wherein:

the silver-adsorbed activated carbon contains at least one of oxidied-impurities and radicals; and the silver-adsorbed activated carbon is brought into contact with a reducing agent other than hydrazine monohydrate before the elution.

49. The process according to claim 48, wherein:

the silver-adsorbed activated carbon is brought into contact with a solution of one of formaldehyde or sodium sulphite.

50. The process according to claim 17, wherein:

the elution step is performed in a cathode compartment of a cell containing diaphragms, where a reducing potential equivalent to that created by said addition of said reducing agent is obtained by adjusting a current intensity through the cell.

* * * * *